US009887905B2

United States Patent
Li et al.

(10) Patent No.: US 9,887,905 B2
(45) Date of Patent: Feb. 6, 2018

(54) TRANSFERRING DATA IN A GATEWAY (71) Applicant: International Business Machines Corporation, Armonk, NY (US)

(72) Inventors: Yuan Li, Changzhou (CN); Gang Tang, Nanjing (CN); Zheng Dong Zhu, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 14/648,278

(22) PCT Filed: Mar. 10, 2014

(86) PCT No.: PCT/CN2014/073132
§ 371 (c)(1),
(2) Date: May 29, 2015

(87) PCT Pub. No.: WO2014/154087
PCT Pub. Date: Oct. 2, 2014

(65) Prior Publication Data
US 2015/0312137 A1    Oct. 29, 2015

(51) Int. Cl.
G06F 15/173    (2006.01)
H04L 12/761    (2013.01)
H04L 12/64     (2006.01)
H04L 12/741    (2013.01)
H04L 29/12     (2006.01)

(52) U.S. Cl.
CPC .......... *H04L 45/16* (2013.01); *H04L 12/6418* (2013.01); *H04L 45/745* (2013.01); *H04L 61/6022* (2013.01); *H04L 61/6068* (2013.01)

(58) Field of Classification Search
CPC . H04L 45/16; H04L 61/6068; H04L 61/6022; H04L 45/745; H04L 12/6418
See application file for complete search history.

(56) References Cited

U.S. PATENT DOCUMENTS 7,505,399 B2   3/2009   McGee et al.
7,693,044 B2   4/2010   Jha et al.
(Continued)

FOREIGN PATENT DOCUMENTS

CN    1505334 A    6/2004
CN    1505335 A    6/2004
(Continued)

OTHER PUBLICATIONS

International Search Report (PCT), International Application No. PCT/CN2014/073132, dated Jun. 19, 2014, pp. 1-4.
(Continued)

*Primary Examiner* — John B Walsh
(74) *Attorney, Agent, or Firm* — David Zwick (57) ABSTRACT

The present invention discloses a gateway and its method of transferring data, the gateway being connected to a network by a SIMM-node. In response to a request to establish multi-MAC address routing information of a SIMM-node, multiple MAC addresses corresponding to an IP address of the SIMM-node are obtained. The multi-MAC address routing information of the SIMM-node is established at least according to the obtained multiple MAC addresses corresponding to the IP address of the SIMM-node. In response to receiving a data message sent to the IP address of the SIMM-node, the data message is routed by using the established multi-MAC address routing information of the SIMM-node.

14 Claims, 8 Drawing Sheets

(56) References Cited

U.S. PATENT DOCUMENTS

| | | | |
|---|---|---|---|
| 7,872,965 B2 | 1/2011 | Enstone et al. | |
| 7,899,848 B2 | 3/2011 | Yin et al. | |
| 8,040,903 B2 | 10/2011 | McGee et al. | |
| 2007/0002826 A1 | 1/2007 | Bennett et al. | |
| 2008/0056246 A1* | 3/2008 | McGee | H04L 29/12028 370/389 |
| 2010/0097926 A1 | 4/2010 | Huang et al. | |
| 2012/0014386 A1* | 1/2012 | Xiong | H04L 29/12028 370/392 |
| 2012/0230343 A1 | 9/2012 | Schrum, Jr. | |
| 2014/0198788 A1* | 7/2014 | Nguyen | H04L 45/54 370/389 |

FOREIGN PATENT DOCUMENTS

| | | |
|---|---|---|
| CN | 101404619 A | 4/2009 |
| CN | 101610283 A | 12/2009 |
| CN | 101729425 A | 6/2010 |
| CN | 101938415 A | 1/2011 |
| CN | 102316136 A | 1/2012 |
| CN | 102474467 A | 5/2012 |
| CN | 104079486 A | 10/2014 |
| WO | 2014154087 A1 | 10/2014 |

OTHER PUBLICATIONS

Written Opinion of the International Searching Authority (PCT), International Application No. PCT/CN2014/073132, dated Jun. 19, 2014, pp. 1-6.

Kendrick, "Configure HA Servers in Data Centers," Center IT/Admin/FHCRC, Sep. 9, 2012, pp. 1-44.

Wadekar, "NIC Teaming and CN," QLOGIC, IEEE 802 Plenary, Nov. 11, 2008, 16 Pages.

Plummer, "An Ethernet Address Resolution Protocol—or—Converting Network Protocol Addresses to 48.bit Ethernet Address for Transmission on Ethernet Hardware," Network Working Group, Nov. 1982, pp. 1-10.

* cited by examiner

| Hardware type | | Protocol type |
|---|---|---|
| Hardware address length | Protocol length | Operation |
| Sender header (octet 0-3) | | |
| Sender header (octet 4-5) | | Sender IP address (octet 0-1) |
| Sender IP address (octet 2-3) | | Target header (octet 0-1) |
| Target header (octet 2-5) | | |
| Target IP address (octet 0-3) | | |

TRANSFERRING DATA IN A GATEWAY

BACKGROUND

Embodiments of the present invention relate to network data transmission, and more specifically, to a gateway and its method of transferring data.

Traditionally, an IP node employs a single IP address and a single MAC address. Some new technologies aimed at the increase of the bandwidth and availability can enable an (either logical or physical) IP node to have a single IP address and multiple MAC addresses. Each MAC address usually corresponds to a physical network interface card (NIC) or egress port. These kinds of nodes are named SIMM-nodes (Single IP address and multiple MAC address).

Figure 1:
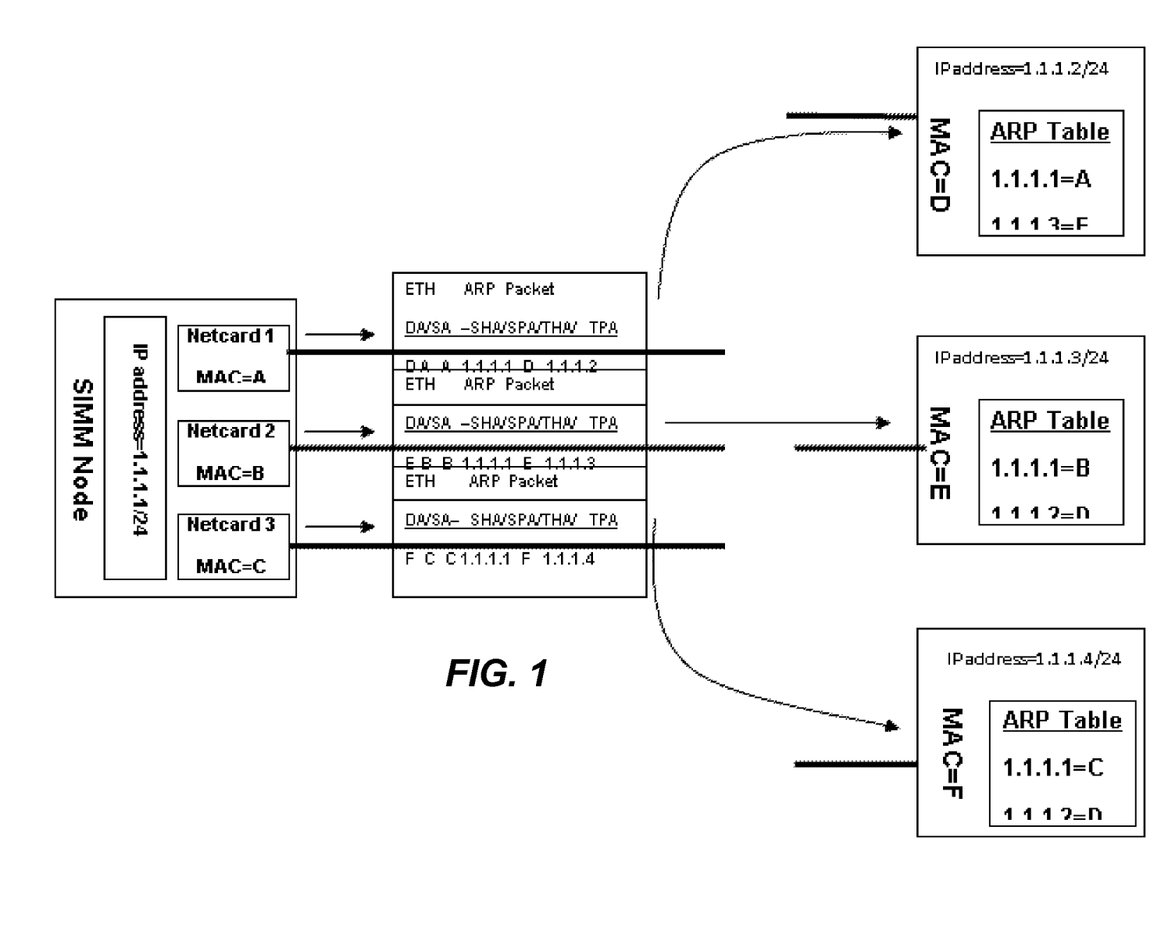
FIG. 1 shows a schematic view where packets from a SIMM-node server can be sent through different NICs to different target nodes by using one IP address.

A server employing the NIC teaming alb/slb mode is an example of SIMM-nodes. NIC teaming binds multiple physical network cards on the same server to a single virtual network card by software; that is, for any external network, this server has only one visible network card. For any application and a network where this server is located, the server has only one network link or only one accessible IP address. FIG. 1 shows a schematic view where packets sent from the SIMM-node server can be sent through different NICs to different target nodes by using one IP address. The solution can increase the network speed on one hand, but can achieve load balancing and fault tolerance between different network cards by teaming on the other hand.

Figure 2:
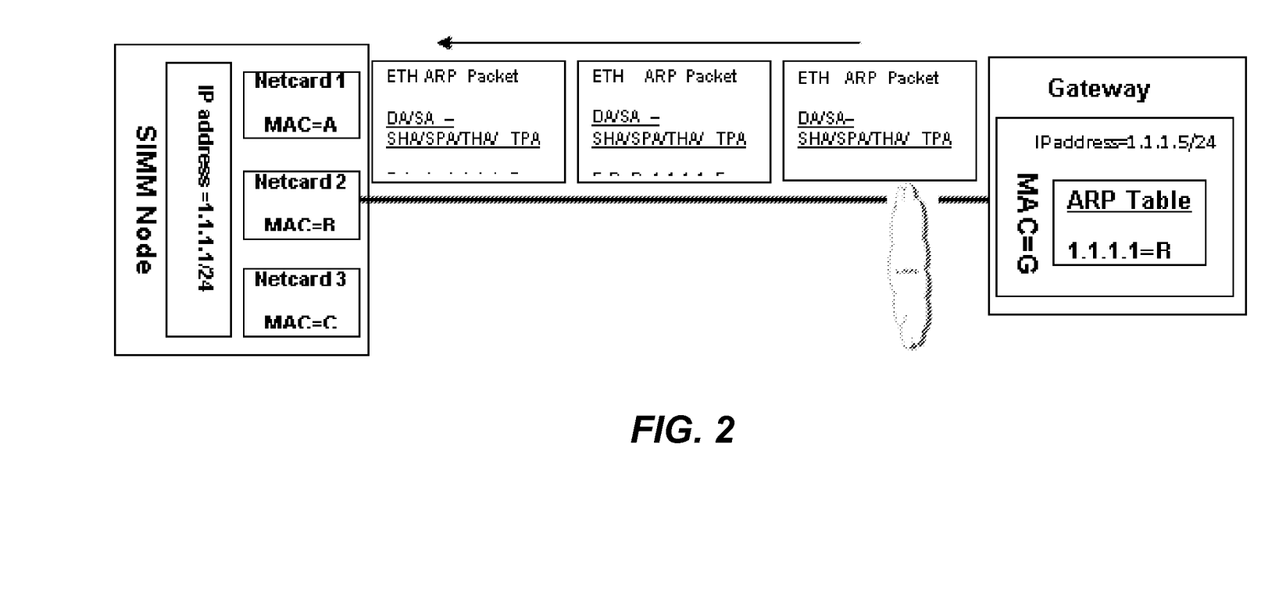
FIG. 2 shows traffic received by a SIMM-node when the SIMM-node and a target node are in different subnets.

However, a problem arises when receiving data on different subnets. FIG. 2 shows the traffic received by a SIMM-node when the SIMM-node and a target node are in different subnets. Here, the traffic being received is not load balanced. This is because the incoming traffic of the SIMM-node has to traverse a gateway; the gateway knows that the SIMM-node only has one IP address; and moreover, the gateway only knows that this IP address corresponds to one MAC address and one egress port due to the existing ARP mechanism. So the traffic to the SIMM-node is only exported through a fixed egress port, and the SIMM-node will receive such three-layer traffic at only one NIC. In this case, the efficiency of the load balancing for traffic received of the SIMM-node degrades because only one NIC or one egress port is active.

BRIEF SUMMARY

To solve the problem in the prior art, the embodiments of the present invention propose a gateway and its method of transferring data.

Embodiments of the present invention disclose a method, computer program product, and system for transferring data by a gateway, the gateway being connected with a SIMM-node. In response to a request to establish multi-MAC address routing information of a SIMM-node, multiple MAC addresses corresponding to an IP address of the SIMM-node are obtained. The multi-MAC address routing information of the SIMM-node is established at least according to the obtained multiple MAC addresses corresponding to the IP address of the SIMM-node. In response to receiving a data message sent to the IP address of the SIMM-node, the data message is routed by using the established multi-MAC address routing information of the SIMM-node.

By means of the method and apparatus of the embodiments of the present invention, it is possible to effectively increase the efficiency of load balancing of the traffic received by the SIMM-node and improve the utilization of bandwidth from the gateway to the SIMM-node.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the understanding of the present disclosure, and conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, in some embodiments, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, an electro-magnetic signal, optical signal, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Figure 3:
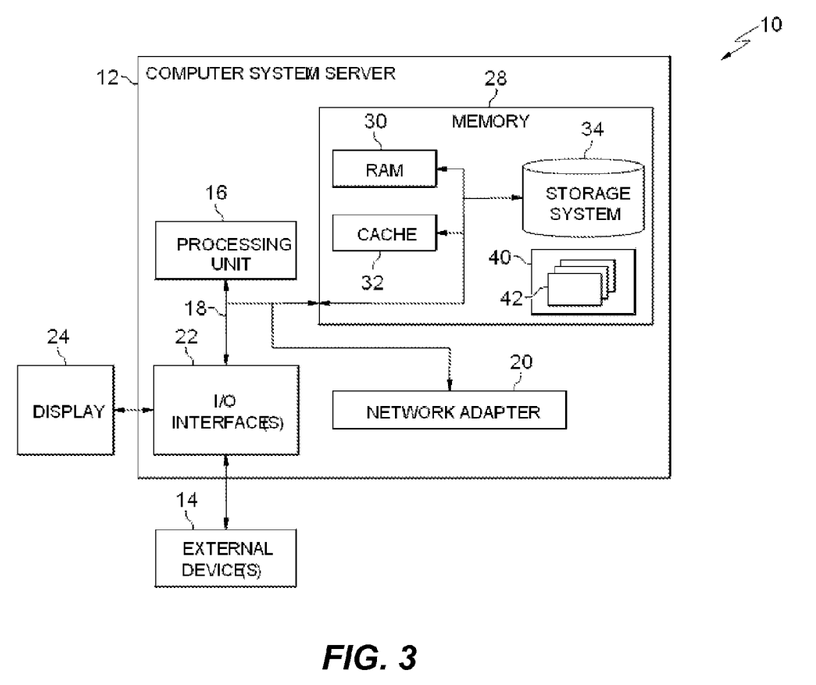
FIG. 3 shows an exemplary block diagram of computer system/server 12 which is applicable to implement the embodiments of the present invention.

Referring now to FIG. 3, in which an exemplary block diagram of computer system/server 12 which is applicable to implement the embodiments of the present invention is shown. Computer system/server 12 shown in FIG. 3 is only illustrative and is not intended to suggest any limitation as to the scope of use or functionality of embodiments of the invention described herein.

As shown in FIG. 3, computer system/server 12 is shown in the form of a general-purpose computing device. The components of computer system/server 12 may include, but are not limited to, one or more processors or processing units 16, a system memory 28, and a bus 18 that couples various system components including the system memory 28 and the processing unit 16.

Bus 18 represents one or more of several types of bus structures, including a memory bus or memory controller, a peripheral bus, an accelerated graphics port, and a processor or a local bus using any of a variety of bus architectures. By way of example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, without limitation.

Computer system/server 12 typically includes a variety of computer system readable media. Such media may be any available media that is accessible by computer system/server 12, and it includes both volatile and non-volatile media, and removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 3 and typically referred to as a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. Memory 28 may include at least one program product having a set (e.g., at least one) of program modules that are configured to carry out the functions of each embodiment of the invention.

Program/utility 40, having a set (at least one) of program modules 42, which include but are not limited to an operating system, one or more application programs, other program modules, and program data, may be stored in memory 28 by way of example. Each of the operating system, one or more application programs, other program modules, and program data or some combination thereof, may include an implementation of a networking environment. Program modules 42 generally carry out the functions and/or method of embodiments of the invention as described herein.

Computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with other components of computer system/server 12 via bus 18. It should be understood that although not shown, other hardware and/or software components, which include but not limit to microcode, device drivers, redundant processing units, external disk drive arrays, RAID systems, tape drives, and data archival storage systems, etc., could be used in conjunction with computer system/server 12.

Embodiments of the present invention will now be described with reference to the accompanying drawings and examples.

In TCP/IP protocols, Node A sends IP packets to Node B. If no other communication protocol is used between the two nodes and communication is implemented with TCP/IP protocols purely, if the two nodes are located in different network segments, normally a gateway packet connection is required so as to find the next destination IP address. IP routing is a process of routing via a route table. A route table will be stored on a gateway. The route table is established according to the routing protocol. As such, Node A checks the IP address of Node B in the route table of its own gateway and then sends data packets by using the routing protocols.

A typical route includes at least two fields: a destination IP address, and a next-hop IP address. The next-hop IP address is an IP node directly connected in a subnet. When forwarding an IP packet, the routing process performs following actions: search the route table for an entry that matches the destination IP based on longest prefix match algorithm; if found, encapsulate the to-be-forwarded IP packet in a frame in the link layer and deliver it to the next-hop IP node directly. The information used for the link layer encapsulation and delivery includes at least the hardware address (such as Ethernet MAC address) of the next-hop IP node along with other link layer information. In typical implementations, a data structure associated with a route stores that information. There is a pointer called next_hop_ptr pointing to the associated structure in the route table. Hereinafter, the data structure is referred to as the NEXT_HOP table. The NEXT_HOP table at least contains an egress port and a next-hop MAC address. The routing protocol transfers data packets to the egress port of the next-hop MAC address according to the egress port and the next-hop MAC address contained in the NEXT_HOP table. Information in the NEXT_HOP table is established according to the address resolution protocol (i.e., ARP protocol).

Figure 4:
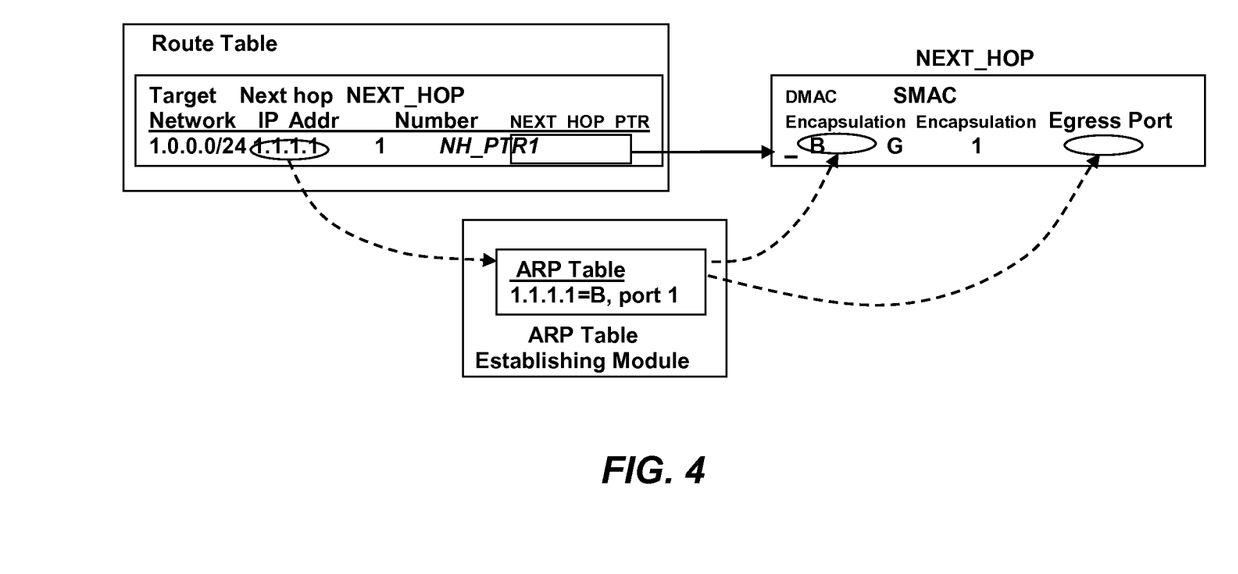
FIG. 4 shows the ARP protocol process and partial information of a route table.

The address resolution protocol is a protocol that determines a physical (MAC) address of a host only with the knowledge of its IP address. FIG. 4 shows the ARP process and partial information of a route table. In ARP protocol, where node A does not know the MAC address and egress port of Node B, an ARP table establishing module of node A broadcasts an ARP request message that contains the IP address of Node B; all computers in the same subset of the Ethernet will receive this request, whereas in normal cases only Node B will give an ARP response message where the MAC address of Node B is filled, and then reply to Node A. An ARP table inside the ARP table establishing module of Node A will contain a mapping relationship between the IP address and the MAC address of Node B, which will be filled in the NEXT_HOP table to which next_hop_ptr points, so that Node A can send packets to Node B and can learn the egress port-related information during MAC address learning upon receipt of the ARP message. During data transmission, according to the example of FIG. 4, it is found in the route table that the next-hop IP address is 1.1.1.1. If the NEXT_HOP table to which pointer of next_hop_ptr in the route table points already contains an egress port and a next-hop MAC address, then data packets are directly transferred to the egress port of the next-hop MAC address; otherwise, the ARP table establishing module uses the address resolution protocol to fill in the NEXT_HOP table and then forwards data packets. It can be seen that in the prior art, a next-hop IP address can be resolved to a unique MAC address in the NEXT_HOP table through ARP protocol or a static configuration.

If Node B is a SIMM-node, when Node B sends a data packet, it leverages a certain algorithm (e.g. HASH algorithm) to select one of network cards for sending, thereby achieving load balancing and fault tolerance between different network cards. However, if Node B receives a data packet from Node A, when the gateway of Node A queries MAC addresses of Node B and thus sends a broadcast ARP request message, each network card of Node B will receive this ARP request message, whereas Node B will select one network card to send an ARP response message according to the certain algorithm (e.g. HASH algorithm) and fill the MAC address of the network card in the ARP response message. Since the IP address of Node A is unique, Node A will only receive the MAC address of one network card of Node B and add the MAC address of Node B to subsequent data messages. Thus, only the network card corresponding to the MAC address among multiple network cards of Node B will receive data messages, which results in load unbalancing.

Figure 5:
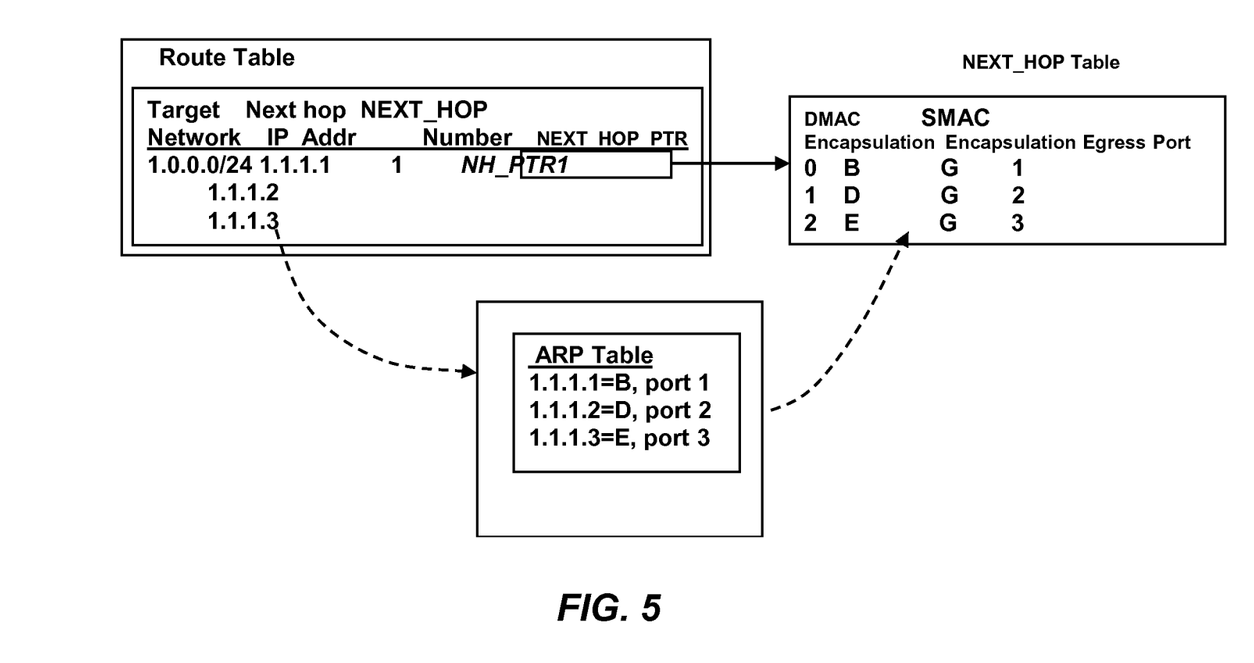
FIG. 5 shows the process of ECMP routing technique and partial information of a route table.

In a network environment where multiple next-hops simultaneously arrive at the same destination address, if using the traditional routing technology, then data packets destined for the destination address can only use one of next-hop links, so equal-cost multi-path routing (ECMP) technology may be used. FIG. 5 shows the process of ECMP routing technology and partial information of a route table. According to FIG. 5, with the presence of ECMP, a next-hop IP address contains multiple IP addresses. When a message is forwarded and routed, if multiple next-hops are found, usually a HASH value is calculated using a destination IP in the message as a KEY (also a destination IP address and a source IP address can be used as a KEY, or even a source port can be used as a KEY), and a next-hop in the NEXT_HOP table is selected for forwarding according to the HASH value. ECMP can ensure multiple links are used in this network environment, which not only increases the transmission bandwidth efficiency but also backs up data transmission of invalid links without any delay and packet loss.

On the basis of traditional ECMP technology, the embodiments of the present invention propose an improved ARP table, wherein the same IP address is allowed to correspond to multiple MAC addresses and egress ports. Thus, load sharing on multiple links is also achieved.

Figure 6:
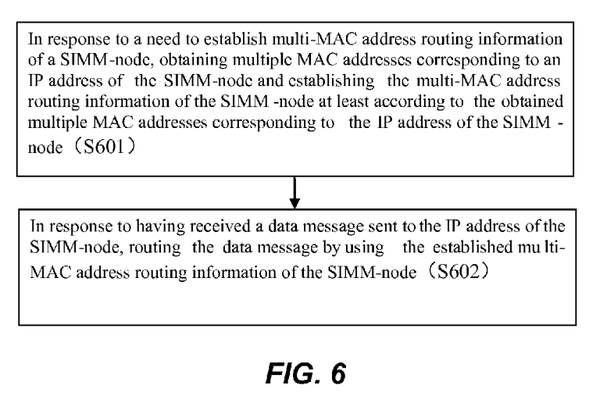
FIG. 6 shows a flowchart of a method of transferring data by a gateway according to one embodiment of the present invention.

Moreover, the embodiments of the present invention disclose a method of transferring data by a gateway, which is connected with a SIMM-node. FIG. 6 shows a flowchart of a method of transferring data by a gateway according to one embodiment of the present invention. According to FIG. 6, the method comprises: in step S601, in response to a need to establish multi-MAC address routing information of a SIMM-node, obtaining multiple MAC addresses corresponding to an IP address of the SIMM-node and establishing the multi-MAC address routing information of the SIMM-node at least according to the obtained multiple MAC addresses corresponding to the IP address of the SIMM-node; in step S602, in response to having received a data message sent to the IP address of the SIMM-node, routing the data message by using the established multi-MAC address routing information of the SIMM-node. Here, the process of establishing multi-MAC address routing information of a SIMM-node requires multiple MAC addresses corresponding to an IP address of the SIMM-node and also other information, such as egress ports, etc.

In one embodiment, the multi-MAC address routing information at least comprises information in each of a route table, an ARP table, and a NEXT_HOP table to which a next-hop pointer in the route table points, and wherein the establishing the multi-MAC address routing information of the SIMM-node comprises: adding to the ARP table corresponding relationships of the IP address with the multiple MAC addresses of the SIMM-node; adding to the NEXT_HOP table the corresponding relationships of the IP address with the multiple MAC addresses of the SIMM-node; and establishing in the route table routing entries of the SIMM-node. Among these three steps, the establishing in the route table routing entries of the SIMM-node may be executed either before or after the other two steps, while the effect remains the same.

In another embodiment, the routing the data message by using the established multi-MAC address routing information of the SIMM-node comprises: obtaining the routing entries of the SIMM-node which are established in the route table; selecting, using ECMP routing technique, one of the multiple MAC addresses corresponding to the IP address of the SIMM-node in the NEXT_HOP table as a receiver MAC address of the data message; and sending the data message to the selected MAC address.

Regarding how a gateway obtains the multiple MAC addresses corresponding to the IP address of the SIMM-node, in one embodiment, the SIMM-node uses an ARP response message to update an ARP buffer of the gateway. For ARP request messages from different IP addresses, the SIMM-node selects a single MAC address as a sender MAC address of the ARP response message according to a specific algorithm (e.g. HASH algorithm); the algorithm can ensure all MAC addresses of the SIMM-node are exposed to the gateway connected with the SIMM-node. This can be used to obtain the multiple MAC addresses corresponding to the IP addresses of the SIMM-node. However, the gateway must use different IP addresses to "fool" the SIMM-node. Therefore, at the gateway end, the method comprises: sending multiple ARP request messages in the same subnet by using sufficient multiple reserved IP addresses as respective source IP address, using the gateway's MAC address as a source MAC address, and using the SIMM-node's IP address as a destination address; in response to having received ARP response messages, ignoring duplicated MAC addresses in multiple ARP responses returned from the SIMM-node, thereby obtaining the multiple MAC addresses corresponding to the IP address of the SIMM-node. This embodiment does not require the SIMM-node to modify ARP protocol but use existing ARP protocol. In a preferred embodiment, the multiple reserved IP addresses are successive IP addresses, which achieve a better effect. These reserved IP addresses are pseudo IP addresses.

In another embodiment, the gateway sends a request for obtaining the MAC addresses corresponding to the IP address of the SIMM-node, and then can directly receive the multiple MAC addresses corresponding to the IP address of the SIMM-node. This embodiment can completely depart from the existing ARP protocol, or the existing ARP protocol may be used.

Figure 7:
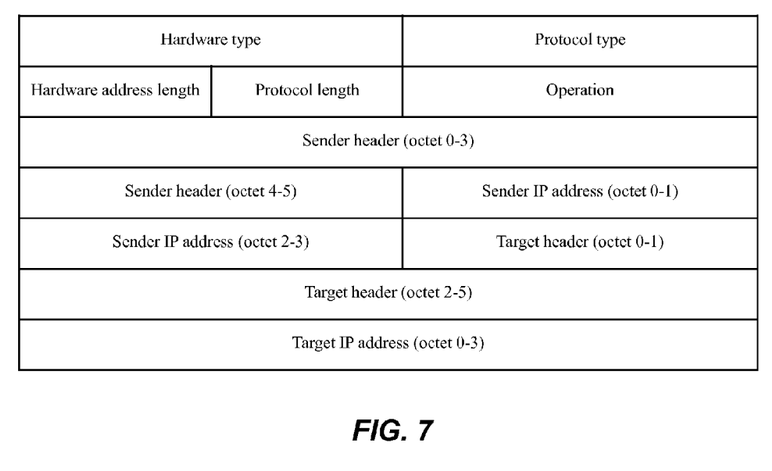
FIG. 7 shows an illustrative extended ARP message format.

In another embodiment, an existing ARP response message may be extended. In one response message, the gateway obtains all MAC addresses of the SIMM at a time in response to having received an extended ARP response message of the sent ARP request message, wherein the extended ARP response message is loaded with the multiple MAC addresses of the SIMM-node. FIG. 7 shows an illustrative extended ARP message format. For this particular ARP message, the hardware type may be set as a type that is currently not yet used, e.g. 240, and then a field as below is added to the end of the ARP message: <address number, sender MAC address*address number>.

Those skilled in the art will recognize that other dialogue modes between the SIMM-node and the gateway may be used for obtaining the multiple MAC addresses corresponding to the IP address of the SIMM-node.

In the foregoing embodiment, if a network card failure or failover occurs, the SIMM-node needs to notify the gateway so that the gateway can re-start the process of creating routing entries of the SIMM-node.

Figure 8:
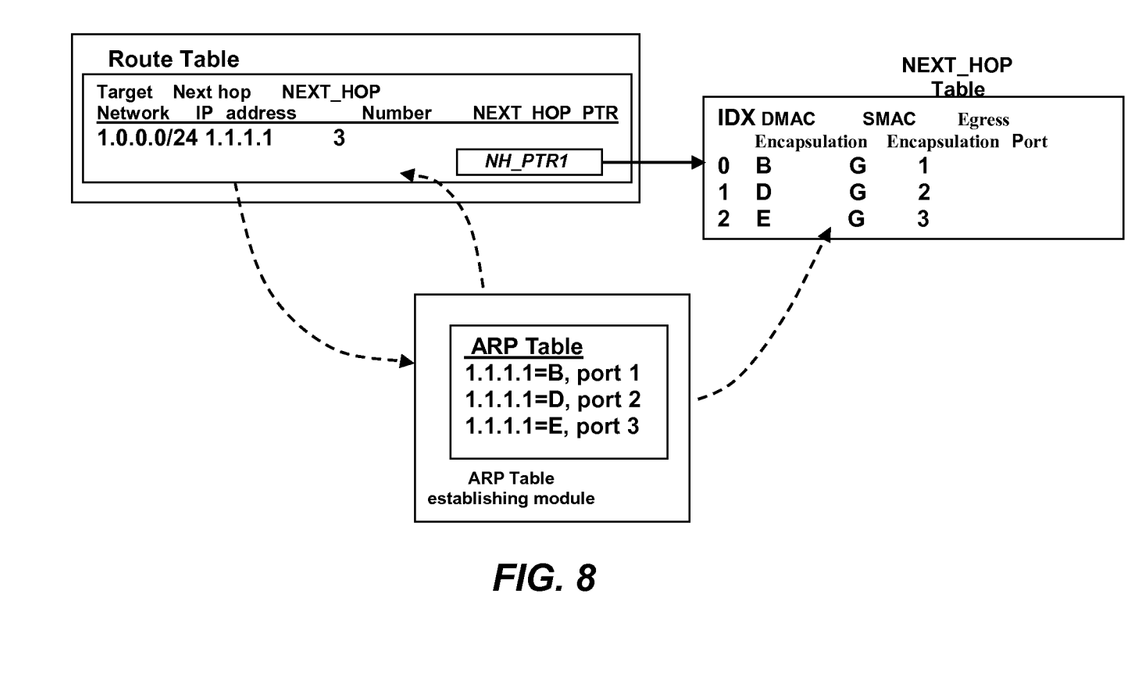
FIG. 8 shows partial information of a route table after the execution of step S602.

FIG. 8 shows partial information of the route table after the execution of step S602. The three arrows in FIG. 8 indicate, respectively, the execution process of the three steps of adding to the ARP table corresponding relationships of the IP address of the SIMM-node with the multiple MAC addresses, adding to the NEXT_HOP table corresponding relationships of the IP address of the SIMM-node with the multiple MAC addresses, and establishing in the route table routing entries of the SIMM-node. After obtaining the multiple MAC addresses corresponding to the IP address of the SIMM-node, corresponding relationships of the IP address of the SIMM-node with the multiple MAC addresses can be added to the ARP table; and according to the corresponding relationships in the ARP table, the corresponding relationships of the IP address of the SIMM-node with the multiple MAC addresses are added to the NEXT_HOP table to which the next-hop pointer in the route table points; upon receipt of the multiple MAC addresses corresponding to the IP address of the SIMM-node, routing entries of the SIMM-node can be established, wherein the number of next hops is recorded as the number of the multiple MAC addresses; also, routing entries of the SIMM-node can be created according to information in the ARP table.

In the routing process of sending a data message to the IP address of the SIMM-node, suppose routing entries of the SIMM-node have been created, then the gateway obtains routing entries of the SIMM-node when receiving the data message sent to the IP address of the SIMM-node. As shown in FIG. 8, according to routing entry information, it is found that the node has a unique IP address but multiple MAC addresses (as shown, three next hops), so it can be determined that the node is a SIMM-node. In turn, an ECMP routing technique is employed, one of the multiple MAC addresses corresponding to the IP address of the SIMM-node in the NEXT_HOP table to which the next-hop pointer points is selected as a receiver MAC address of the data message, and the data message is then sent to the selected MAC address. In this way, when the gateway receives a three-layer message to the SIMM-node, the load between multiple network interface cards in the SIMM-node can be balanced.

Figure 9:
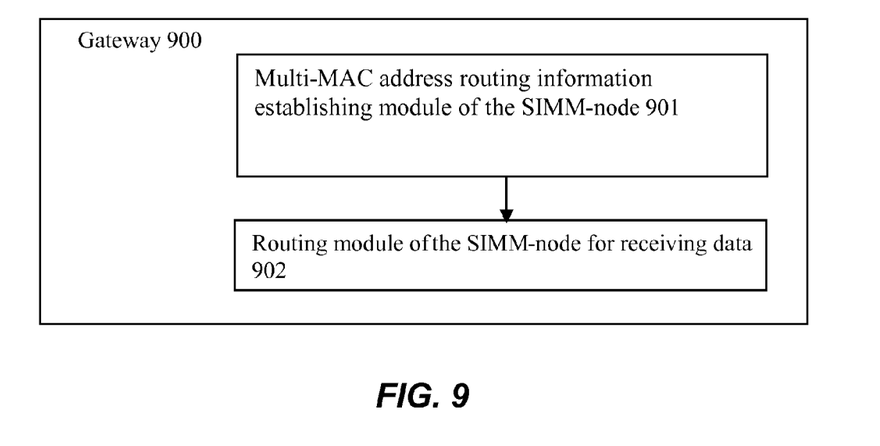
FIG. 9 shows a layout view of a gateway according to one embodiment of the present invention.

Under the same inventive concept, the embodiments of the present invention further disclose a gateway, which is connected with a SIMM-node. FIG. 9 shows a layout view of a gateway according to one embodiment of the present invention. According to FIG. 9, the gateway comprises: a multi-MAC address routing information establishing module of the SIMM-node 901, configured to, in response to a need to establish multi-MAC address routing information of a SIMM-node, obtain multiple MAC addresses corresponding to an IP address of the SIMM-node and establish the multi-MAC address routing information of the SIMM-node at least according to the obtained multiple MAC addresses corresponding to the IP address of the SIMM-node; and a routing module of the SIMM-node for receiving data 902 configured to, in response to having received a data message sent to the IP address of the SIMM-node, routing the data message by using the established multi-MAC address routing information of the SIMM-node.

In one embodiment, the multi-MAC address routing information at least comprises information in each of a route table, an ARP table, and a NEXT_HOP table to which a next-hop pointer in the route table points, and wherein the multi-MAC address routing information establishing module of the SIMM-node comprises: an ARP table establishing module configured to add to the ARP table corresponding relationships of the IP address with the multiple MAC addresses of the SIMM-node; a NEXT_HOP table establishing module configured to add to the NEXT_HOP table the corresponding relationships of the IP address with the multiple MAC addresses of the SIMM-node; and a routing entry establishing module configured to establish in the route table routing entries of the SIMM-node.

In another embodiment, the routing module of the SIMM-node for receiving data comprises: a routing entry obtaining module configured to obtain the routing entries of the SIMM-node which are established in the route table; a selecting module configured to select, using ECMP routing technique, one of the multiple MAC addresses corresponding to the IP address of the SIMM-node in the NEXT_HOP table as a receiver MAC address of the data message; and a sending module configured to send the data message to the selected MAC address.

In one embodiment, the multi-MAC address routing information establishing module of the SIMM-node comprises: an ARP request message sending module configured to send sufficient multiple ARP request messages in a same subnet by using sufficient multiple reserved IP addresses as respective source IP address, using the gateway's MAC address as a source MAC address, and using the SIMM-node's IP address as a destination IP address; and a duplicated entry ignoring module configured to in response to having received sufficient multiple ARP response messages from the SIMM node, ignore duplicated destination MAC addresses in the returned multiple ARP response messages, thereby obtaining the multiple MAC addresses corresponding to the IP address of the SIMM-node.

In one embodiment, the multi-MAC address routing information establishing module of the SIMM-node comprises: a multi-MAC address request sending module configured to send to the connected SIMM node a request for obtaining the multiple MAC addresses corresponding to the IP address of the SIMM node; and a multi-Mac address receiving module configured to receive the multiple MAC addresses corresponding to the IP address of the SIMM node.

In one embodiment, the multi-MAC address routing information establishing module of the SIMM-node comprises: an ARP request message sending module configured to send an ARP request message for obtaining the MAC addresses corresponding to the IP address of the SIMM node; and an extended ARP response message receiving module configured to receive an extended ARP response message, wherein the extended ARP response message is loaded with the multiple MAC addresses of the SIMM node.

In another embodiment, the routing entry establishing module is further configured to update the number of next hops in the route table.

In a further embodiment, the routing entry obtaining module is further configured to: according to the routing entries of the SIMM node which are established in the route table, determine that the node has a unique IP address but multiple different MAC addresses, thereby determining the node as a SIMM node.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method of transferring data by a gateway, the gateway being connected to a network with a SIMM-node, the method comprising:
   in response to a request to establish multi-MAC address routing information of a SIMM-node:
      sending an ARP request message for obtaining the MAC addresses corresponding to the IP address of the SIMM node;
      receiving an extended ARP response message, wherein the extended ARP response message is loaded with the multiple MAC addresses of the SIMM node; and establishing the multi-MAC address routing information of the SIMM-node at least according to the obtained multiple MAC addresses corresponding to the IP address of the SIMM-node; and in response to having received a data message sent to the IP address of the SIMM-node, routing the data message by using the established multi-MAC address routing information of the SIMM-node.

2. The method according to claim 1, wherein the multi-MAC address routing information at least comprises information in each of a route table, an ARP table, and a NEXT_HOP table to which a next-hop pointer in the route table points, and wherein the establishing the multi-MAC address routing information of the SIMM-node comprises:

adding to the ARP table corresponding relationships of the IP address with the multiple MAC addresses of the SIMM-node;

adding to the NEXT_HOP table the corresponding relationships of the IP address with the multiple MAC addresses of the SIMM-node; and establishing in the route table routing entries of the SIMM-node.

3. The method according to claim 2, wherein the routing the data message by using the established multi-MAC address routing information of the SIMM-node comprises:

obtaining the routing entries of the SIMM-node which are established in the route table;

selecting, using ECMP routing technique, one of the multiple MAC addresses corresponding to the IP address of the SIMM-node in the NEXT_HOP table as a receiver MAC address of the data message; and sending the data message to the selected MAC address.

4. The method according to claim 1, wherein the obtaining multiple MAC addresses corresponding to an IP address of the SIMM-node comprises:

sending sufficient multiple ARP request messages in a same subnet by using sufficient multiple reserved IP addresses as respective source IP address, using the gateway's MAC address as a source MAC address, and using the SIMM-node's IP address as a destination IP address; and in response to having received sufficient multiple ARP response messages from the SIMM node, ignoring duplicated destination MAC addresses in the returned multiple ARP response messages, thereby obtaining the multiple MAC addresses corresponding to the IP address of the SIMM-node.

5. The method according to claim 1, wherein the obtaining multiple MAC addresses corresponding to an IP address of the SIMM-node comprises:

sending a request for obtaining the multiple MAC addresses corresponding to the IP address of the SIMM node; and receiving the multiple MAC addresses corresponding to the IP address of the SIMM node.

6. The method according to claim 2, wherein establishing in the route table routing entries of the SIMM-node includes updating the number of next hops in the route table.

7. The method according to claim 3, wherein the obtaining the routing entries of the SIMM-node which are established in the route table comprises: according to the routing entries of the SIMM node which are established in the route table, determining that the node has a unique IP address but multiple different MAC addresses, thereby determining the node as a SIMM node.

8. A computer system operating as a gateway for transferring data, the computer system being connected to a network with a SIMM-node, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions comprising one or more executable instructions for implementing specified logic, the logic comprising:

multi-MAC address routing information establishing logic configured to, in response to a need to establish multi-MAC address routing information of the SIMM-node:

send an ARP request message for obtaining the MAC addresses corresponding to the IP address of the SIMM node;

receive an extended ARP response message, wherein the extended ARP response message is loaded with the multiple MAC addresses of the SIMM node; and establish the multi-MAC address routing information of the SIMM-node at least according to the obtained multiple MAC addresses corresponding to the IP address of the SIMM-node; and routing logic configured to, in response to having received a data message sent to the IP address of the SIMM-node, route the data message by using the established multi-MAC address routing information of the SIMM-node.

9. The computer system according to claim 8, wherein the multi-MAC address routing information at least comprises information in each of a route table, an ARP table, and a NEXT_HOP table to which a next-hop pointer in the route table points, and wherein the multi-MAC address routing information establishing logic comprises:

ARP table establishing logic configured to add to the ARP table corresponding relationships of the IP address with the multiple MAC addresses of the SIMM-node;

NEXT_HOP table establishing logic configured to add to the NEXT_HOP table the corresponding relationships of the IP address with the multiple MAC addresses of the SIMM-node; and routing entry establishing logic configured to establish in the route table routing entries of the SIMM-node.

10. The computer system according to claim 9, wherein the routing logic comprises:

routing entry obtaining logic configured to obtain the routing entries of the SIMM-node which are established in the route table;

selecting logic configured to select, using ECMP routing technique, one of the multiple MAC addresses corresponding to the IP address of the SIMM-node in the NEXT_HOP table as a receiver MAC address of the data message; and sending logic configured to send the data message to the selected MAC address.

11. The computer system according to claim 8, wherein the multi-MAC address routing information establishing logic comprises:

ARP request message sending logic configured to send sufficient multiple ARP request messages in a same subnet by using sufficient multiple reserved IP addresses as respective source IP address, using the gateway's MAC address as a source MAC address, and using the SIMM-node's IP address as a destination IP address; and duplicated entry ignoring logic configured to, in response to having received sufficient multiple ARP response messages from the SIMM node, ignore duplicated destination MAC addresses in the returned multiple ARP response messages, thereby obtaining the multiple MAC addresses corresponding to the IP address of the SIMM-node.

12. The computer system according to claim 8, wherein the multi-MAC address routing information establishing logic comprises:
   multi-MAC address request sending logic configured to send a request for obtaining the multiple MAC addresses corresponding to the IP address of the SIMM node; and
   multi-MAC address receiving logic configured to receive the multiple MAC addresses corresponding to the IP address of the SIMM node.

13. The computer system according to claim 9, wherein the routing entry establishing logic is further configured to update the number of next hops in the route table.

14. The computer system according to claim 10, wherein the routing entry obtaining logic is further configured to: according to the routing entries of the SIMM node which are established in the route table, determine that the node has a unique IP address but multiple different MAC addresses, thereby determining the node as a SIMM node.

* * * * *